Aug. 11, 1931.  M. HALLEAD  1,818,323
BEARING
Filed May 7, 1928

INVENTOR.
Mervil Hallead
BY
ATTORNEY.

Patented Aug. 11, 1931

1,818,323

UNITED STATES PATENT OFFICE

MERVIL HALLEAD, OF COLUMBUS, OHIO, ASSIGNOR TO THE EXACT WEIGHT SCALE COMPANY, OF COLUMBUS, OHIO, A CORPORATION OF OHIO

BEARING

Application filed May 7, 1928. Serial No. 275,596.

My invention relates to bearings. It relates, particularly, to a bearing and thrust plate of that type commonly used in weighing scales in conjunction with knife edge trunnions, and to a method of mounting the same in a bearing container.

Heretofore, two oppositely disposed bearings used in scales or the like as a support for knife edge trunnions have been made, as a general rule, from a solid steel block which was first drawn to shape, heat treated, and then milled or ground to such extent that it presented the desired supporting surface. Such bearings had thrust plates formed integrally therewith.

The bearings and thrust plates were then placed in the bearing containers which were sufficiently large to permit the bearings to align themselves accurately with each other each time a knife edge trunnion was placed thereon. In some instances, the bearings and thrust plates have been pivotally mounted in the containers. In other instances, the bearings have been accurately aligned in the containers by placing knife edge trunnions thereon and then filling the space between the aligned bearings and the containers with some substance to maintain the bearings in their position of alignment.

Aside from the fact that the bearings are apt to become disaligned in the containers and, consequently, with each other, there is a large amount of time and labor required to complete the various separate operations incident to forming such bearings and their supports. For instance, the bearing containers must be cast or otherwise formed and sufficient space must be left in such containers to permit self-alignment of the bearings.

Solid blocks, usually of steel, must then be formed and heat treated, after which the blocks are milled or ground until they present the desired bearing surfaces. The milled or ground blocks are then placed in the bearing container and the trunnions of the scale parts are placed on the bearings to align them accurately with each other, whereupon the bearings may, if desired, be rigidly fastened in the containers.

Bearings whose surfaces have been formed by milling or grinding operations have chatter marks or ridges left thereon by the milling or grinding tools and do not provide a smooth supporting surface for the usual knife edge trunnion, with the result that efficiency of operation of the bearing is materially decreased.

It is one object of my invention to provide bearings of the type mentioned above which have smooth bearing surfaces.

Another object of my invention is to provide bearing supporting surfaces and thrust plates which are economical to manufacture.

Still another object of my invention is to provide bearings and thrust plates and a method of mounting these bearings and thrust plates in a container which is economical and, at the same time, will permit accurate alignment of the bearings and thrust plates with relation to each other and to the container and will positively maintain them in accurate alignment.

I accomplish the objects of my invention by providing bearings and thrust plates which are stamped to the required shapes by well-known means. These bearings and thrust plates are then assembled and placed in a die, whereupon the bearing container is cast around them in such manner that they will be rigidly assembled with the container and held in a position of accurate alignment. It will be understood that the die in which the container is cast will be accurate in all details as regards alignment.

Other objects of my invention may be seen in the following detailed description and the preferred embodiment of my invention may be seen in the accompanying drawings wherein similar characters of reference designate corresponding parts and wherein.

Figure 1:
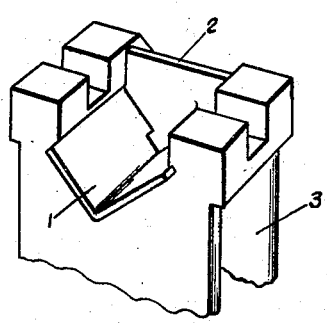
Figure 1 is a perspective view showing a bearing formed in accordance with my invention and rigidly mounted in a bearing container.
Figure 2:
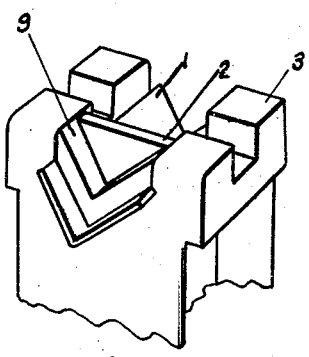
Figure 2 is a view similar to Figure 1 but of the opposite side of the bearing and container.
Figure 3:
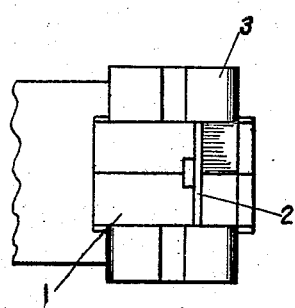
Figure 3 is a top plan view of the bearing and bearing container shown in Figures 1 and 2.
Figure 4:
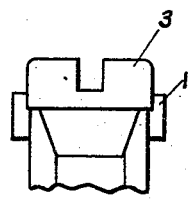
Figure 4 is a side view of the bearings and containers shown in Figures 1, 2 and 3.
Figure 5:
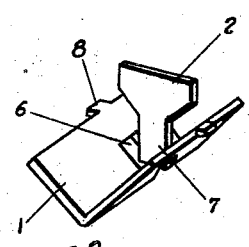
Figure 5 is a perspective view showing the bottom plate and thrust plate of my bearing in disassembled relation.

Referring to the drawings, I have shown my invention as comprising a bearing embodying a bottom plate 1 and thrust plate 2 which are disposed in a bearing container 3. As shown in Figure 5, the bottom plate 1 has a slot 6 therethrough and the thrust plate 2 had an extension 7 thereon, which extension is adapted to extend through the slot 6 in the bottom plate when the bottom plate and thrust plate are in assembled relation. Also, the bottom plate 1 is provided with outwardly extending lugs 8 for a purpose hereinafter described.

As to the method of forming the bearings and supports in such manner that the bearings will be aligned accurately and will be maintained in a position of accurate alignment, the bottom plate 1 and thrust plate 2 are first stamped in any well-known manner from a piece of suitable material. Then, these separate parts are assembled by inserting the extension 7 of the thrust plate 2 through the slot 6 in the bottomplate and then temporarily fastening these two parts together with a small amount of solder or by other means.

After the bottom plate and thrust plate have been properly assembled, they are placed in a suitable casting die. It will be understood that the various parts of the casting die are in accurately aligned relation.

At this time, the metal of which the bearing containers 3 are to be formed, having been previously melted, is poured into the die, whereupon it flows around the bottom plate 1, that part of the extension 7 on the thrust plate 2 which extends below the bottom plate 1, and around the outwardly extending lugs 8 on the bottom plate 1, to form a bearing support with a bearing disposed therein substantially of the form shown in the drawings. The melted metal then cools and hardens. On hardening, the metal of which the containers are formed will hold the bottom plate 1 and thrust plate 2 firmly and securely in a fixed position.

As shown in Figures 1 to 4, inclusive, of the drawings, the bottom plates 1 are made long enough to provide a sufficient amount of bottom plate to permit such plates to be supported in a die without encroaching on the space ordinarily taken by the bearing container. Also, a bar of metal 9 is provided immediately back of the thrust plate 2 to form a brace for such thrust plate.

I have provided a bearing having numerous advantageous features. One of these advantages resides in the fact that the bottom plate 1 and thrust plate 2 of the bearing are formed by stamping pieces of metal to the desired shape. While permitting a bearing to be produced very economically, stamped bearings provide a much more efficient bearing surface than those bearings whose surfaces are milled or ground by eliminating any chatter marks or ridges which are usually left by a milling or grinding tool.

Another advantage is due to the fact that I provide bearings and thrust plates which are rigidy mounted in their containers in accurate alignment and do this economically and with a minimum amount of labor. Still another advantage resides in the fact that each set of bearings does not have to be separately aligned. This is due to the method of mounting the bearings which consists in placing the bearings and thrust plates in a die and then casting the containers around the bearings. By providing a die having its parts accurately aligned, it is possible to produce successive bearings and containers having the bearings in accurate alignment with each other and with the container. Such method is also more economical than former methods.

Having thus described my invention, what I claim is:

1. A bearing comprising a main supporting surface, a thrust supporting surface and a carrier die-cast around the supporting surface structure.

2. In a bearing, a stamped metal bottom plate having a slot therein and a stamped metal thrust plate having an extension thereon that is adapted to interfit with the slot in said bottom plate, and means for holding said bearing and said thrust plate in assembled relation.

3. In a bearing, a stamped metal bottom plate having a slot therein and a thrust plate having an extension thereon that is adapted to interfit with the slot in said bottom plate, and means for holding said bearing and said thrust plate in assembled relation.

4. In a bearing, a stamped metal bottom plate having a slot therein and a stamped metal thrust plate having an extension thereon that is adapted to interfit with the slot in said bottom plate, and means for holding said bearing and said thrust plate in assembled relation, said means embodying a support for the bearing.

5. In a bearing, a bottom plate having a slot therein and a thrust plate having an extension thereon that is adapted to interfit with the slot on said bottom plate, and means for holding said bearing and said thrust plate in assembled relation, said means embodying a support for the bearing.

6. In a bearing, a stamped metal bottom plate, and a stamped metal thrust plate, means for maintaining said bottom plate and said thrust plate in assembled relation, said means embodying a support for said bearing and a brace for said thrust plate.

In testimony whereof I hereby affix my signature.

MERVIL HALLEAD.